UNITED STATES PATENT OFFICE.

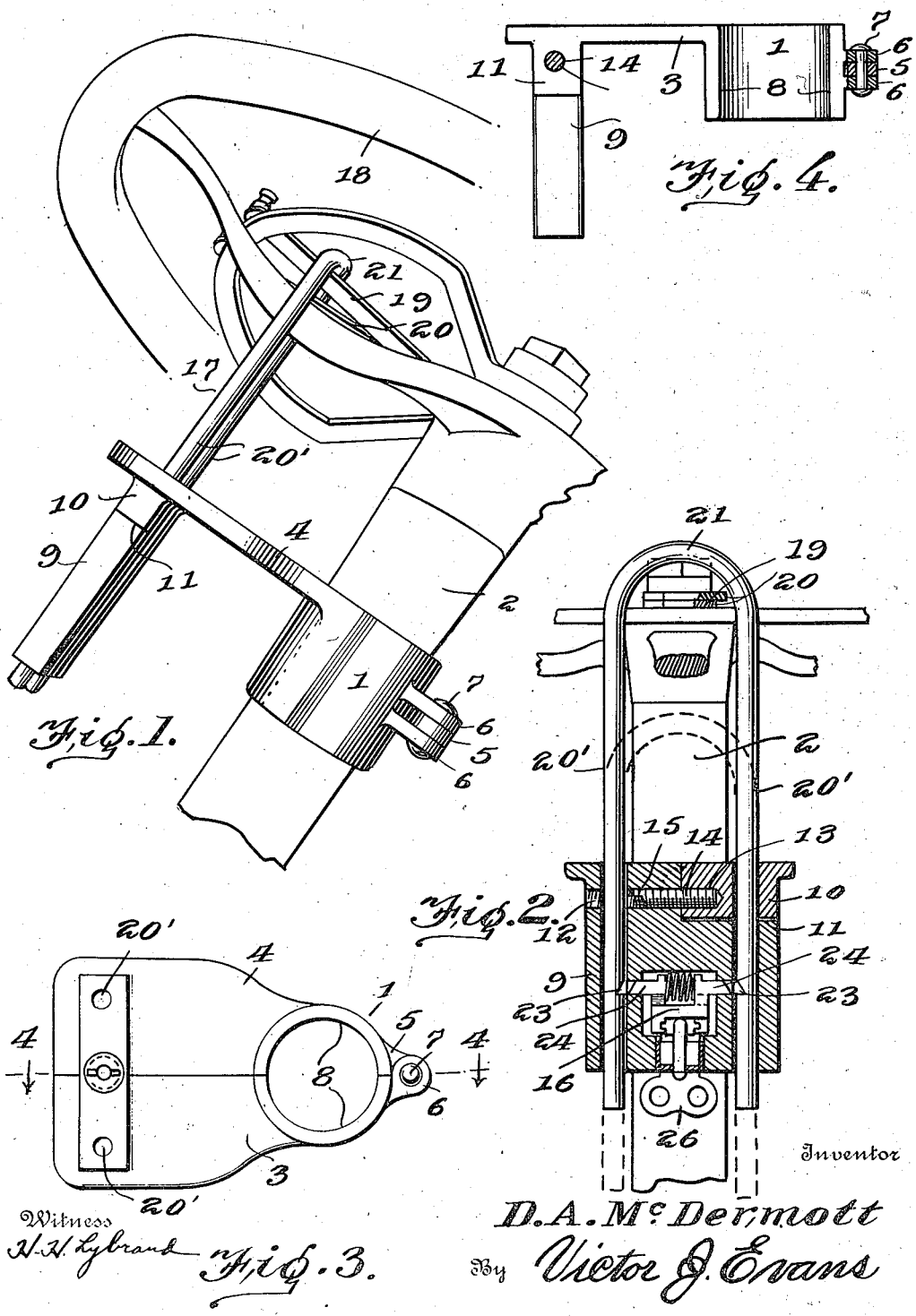

DANIEL A. McDERMOTT, OF PHILADELPHIA, PENNSYLVANIA.

VEHICLE-LOCK.

1,228,123.  Specification of Letters Patent.  Patented May 29, 1917.

Application filed June 24, 1916. Serial No. 105,633.

*To all whom it may concern:*

Be it known that I, DANIEL A. McDERMOTT, a citizen of the United States, residing at Philadelphia, in the county of Philadelphia and State of Pennsylvania, have invented new and useful Improvements in Vehicle-Locks, of which the following is a specification.

This invention has reference to improvements in vehicle locks, and, with regard to the more specific features thereof, provides means for temporarily locking the steering and power regulating members of an automobile, so that the latter cannot be operated by unauthorized persons or others during the absence of the vehicle's owner or operator.

In carrying out the invention use is made of a detachable locking element secured to the steering column of an automobile, said element being provided with a coöperating yoke member which is adapted, when the vehicle is left unattended, to clamp against movement the steering wheel and power controlling levers of the automobile in an effective manner, which will prevent the latter elements from being operated to control the movements of the vehicle; further means being provided to release the said yoke member from the locking element on the insertion of a proper key carried by the authorized operator of the automobile.

Further objects reside in a lock of the above character which will be efficient and positive in operation, capable of being quickly connected or disconnected with the controlling mechanism of a vehicle and which is strong and durable in construction whereby it will be impossible to injure the latter to such an extent that the vehicle could be operated when the lock is in an active position.

Other objects will be in part obvious and in part pointed out hereinafter.

The invention accordingly consists in the novel features of construction, combination of elements, arrangement of parts which will be exemplified in the construction herein described and the scope of the application of which will be indicated in the following claims.

In the accompanying drawings, wherein is shown one of the various possible embodiments of the invention—

Figure 1 is a perspective view of the vehicle lock, comprising the present invention, illustrating the same when applied to a vehicle, Fig. 2 is a vertical sectional view taken through the same, Fig. 3 is a bottom plan view of the lock, Fig. 4 is a section taken on the line 4—4 of Fig. 3, and Fig. 5 is a detail view illustrating the lock in its inactive position.

Similar characters of reference refer to similar parts throughout the several views of the drawing.

Referring to the drawings, the invention in its preferred form consists of a clamp 1 which is adapted to be secured to the steering column 2 of an automobile or other vehicle (not shown). The clamp in its preferred form embodies pivotally connected jaws 3 and 4, the jaw 3 being provided with an offset apertured lug 5, which is situated between similar lugs 6, formed on the jaw 4. A rivet 7 or the like passes through the alining apertures formed in the lug in order to secure the jaws and to form a fulcrum of the same. Registering semicircular recesses 8 are provided in the jaws in order to form a circular opening for the reception of the steering column 2, said jaws being adapted to frictionally engage the column 2 and to be locked thereon, whereby said clamp will be securely positioned upon the column.

In order to lock the jaws 3 and 4 together around the column 2 the same are provided with integral depending projections 9 and 10, the projection 9 being provided with a recess 11 for the reception of a projection 10, said jaw members being positioned about the column 2. An internally threaded bore 12 is formed in the projection 10 and alines with a horizontally extending bore 13 formed in the projection 9, the bores 12 and 13 receiving a screw or bolt 14, which secures the jaws 3 and 4 in locked relation. It will be noted that the head 15 of the screw is disposed within the bore 13, this being accomplished in order to prevent the removal of said screw, as will be more fully set forth, so as to remove the clamp 1 from the steering column 2. The projection 9 has the lower extremity thereof provided with key actuated lock mechanism 16 which is adapted to coöperate with a yoke member 17, the latter being employed to lock the steering wheel 18 of an automobile and the throttle and spark controlling levers 19 and 20 thereof against movement when the machine is left unattended.

The yoke 17 consists of a steel rod member bent to provide parallel vertically extending legs 20 and a curved extremity 21, the legs 20 being normally received in vertically extending openings 23 formed in the projections 9 and 10, and are further provided with locking notches 23 which are adapted to be engaged by the spring latches 24 of the lock mechanism 16.

In operation the clamp 1 is secured to the steering column 2 at a point directly beneath the steering wheel 18, the clamp being so positioned that it will not interfere with the movements of the operator of the vehicle. The yoke member 17 is then inserted into the openings 22 of the clamp 1 and normally lies beneath the plane of the wheel 18, so as not to interfere with the movement of the latter. When the operator of the vehicle desires to leave the same unattended, the yoke 17 is removed from a clamp 1 so that the legs 20 thereof will pass around a spoke 25 of the steering wheel and the levers 19 and 20, whereby the distance of the steering wheel and levers will be confined to the distance between the legs 17, this movement, however, being insufficient to successfully operate the vehicle. The lower extremities of the yoke 17 are then inserted into the openings 22 until the recesses 23 thereof are engaged by the spring latches 24 of the lock mechanism, thus preventing the yoke 17 from being moved upwardly to effectively release the steering wheel 16 and the levers 19 and 20 until the lock mechanism is actuated. However, when the operator of the car again wishes to use the same the yoke may be removed from the steering wheel 18 and associated levers 19 and 20 by inserting a key or the like 26 into the lock mechanism 16, so that the latches 24 thereof may be retracted from the notches 23 of the yoke 17. This action permits the yoke to be elevated in order to free the steering wheel and the levers 19 and 20. When the yoke 17 is in an inactive position, the same cannot be removed from the clamp 1 by mischievous persons, due to the fact that the notches 23 will be engaged by the spring latches 24 which will prevent the same from being elevated beyond a certain point. Thus, in order to remove said yoke it will be necessary for the operator of the machine to actuate the lock mechanism 16 in order that the latches 24 may be moved to a position clear of the legs 20. It will be noted that the legs 20 when extending through the openings 2 completely cover the bore 13, thus making it impossible for any one to insert a screw driver or the like into the opening 13 to remove the screw 14, in order that the clamp 1 may be taken off the steering column 2.

It will thus be seen that there is provided a device in which the objects of this invention are achieved and all of the advantageous features above mentioned, are among others, present. The lock is positive in operation, of few and simple parts which are so related that it is impossible for the same to become readily lost or stolen. The device may be readily operated upon the insertion of a proper key into the lock mechanism thereof, and the parts are so constructed that when once set the same will be insured against slipping so as to render the operation of the lock entirely reliable.

As many changes could be made in the above construction and many apparently widely differing embodiments of this invention could be made without departing from the scope thereof, it is intended that all matter contained in the above description or shown in the accompanying drawing, shall be interpreted as illustrative and not in a limiting sense.

Having described the invention, what is claimed as new and patentable is:—

1. A vehicle lock comprising, in combination, a clamp capable of being secured to the steering column of a motor driven vehicle said clamp embodying pivotally connected jaws, means carried by said jaws to secure said clamp to said steering column, a yoke member passing through openings formed in said jaw and adapted to prevent the removal of said clamp securing means when positioned in said openings, lock mechanism carried by said jaws for securing said yoke to said locking member, and said yoke formed to embrace the steering wheel and controlling levers of said vehicle when secured to said locking element.

2. A vehicle lock comprising in combination a clamp capable of being secured to the steering column of a motor driven vehicle, said clamp embodying a pair of pivotally connected jaws, interfitting depending members carried by the respective jaws, means for holding said interfitting members locked operatively, and a yoke adapted to straddle a spoke in the steering wheel and the controlling levers of the vehicle, said yoke passing through openings in said interfitting members at opposite sides of the locking means therefor to eliminate access being had to said means with the yoke in position, and key actuated means for locking said yoke within the openings of said interfitting members.

In testimony whereof I affix my signature in presence of a witness.

DANIEL A. McDERMOTT.

Witness:
AMY B. HORN.